3,194,636
HYDROGEN FROM HYDROCARBONS
James E. McEvoy, Morton, Pa., and Thomas Henry Milliken, Jr., New York, N.Y., assignors to Air Products and Chemicals, Inc., a corporation of Delaware
Filed Aug. 15, 1962, Ser. No. 217,020
The portion of the term of the patent subsequent to Oct. 9, 1979, has been disclaimed and dedicated to the Public
1 Claim. (Cl. 23—212)

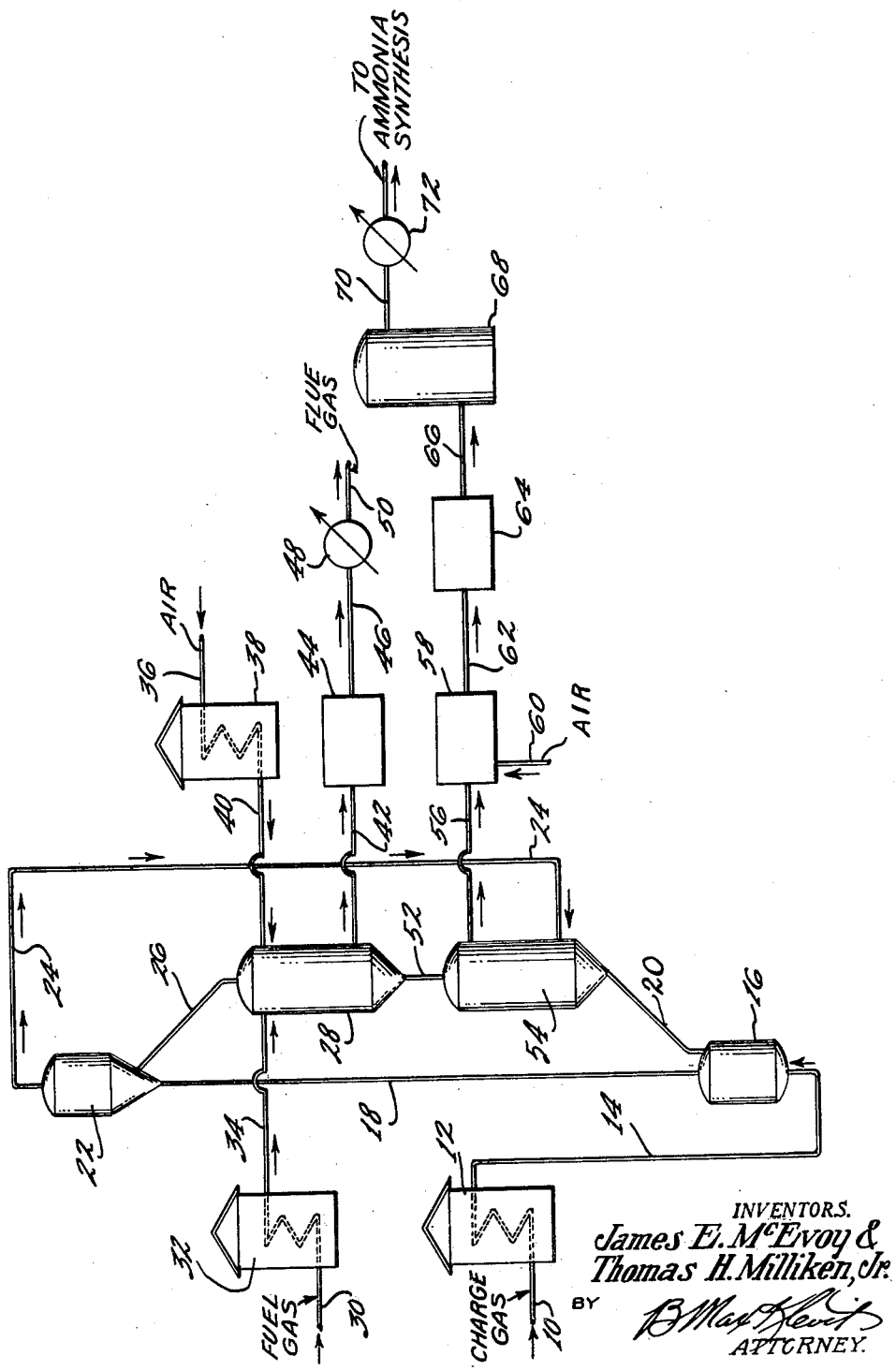

Reference is made to application Serial No. 546,506, filed November 14, 1955, now U.S. Patent 3,057,689, having a detailed description identical hereto, and expiring simultaneously herewith.

The present invention relates to the production of hydrogen by the cracking of a low molecular weight normally gaseous hydrocarbon at an elevated temperature, and more specifically to a process for cracking a low molecular weight normally gaseous hydrocarbon to produce hydrogen utilizing a catalyst comprising iron or an iron oxide impregnated upon a porous solid support, such as kaolin.

The cracking of low molecular weight normally gaseous hydrocarbons such as natural gas, and in particular methane, to molecular hydrogen is commonly effected by heating such hydrocarbons to high temperatures. More recently, the cracking of such hydrocarbons in the presence of metal pebbles, such as pebbles of elemental iron and nickel, or alloys such as Inconel or Monel, which metal pebbles serve as heat transfer agents, has been suggested. However, these metallic materials have not proved satisfactory for this purpose, because they are prone to sinter at the very high cracking temperatures, such as temperatures of 1400° F. to 2400° F. needed to effect cracking of low molecular weight hydrocarbons to elemental hydrogen. The formation of massive sintered or fritted agglomerates leads to the malfunction of processing equipment and the eventual breakdown and inutility of the process.

A serious difficulty arising from the use of elemental metallic catalysts, such as iron, for the preparation of hydrogen is the oxidation of such catalysts from the reduced state that is used during on-stream processing to a relatively highly oxidized state during the regeneration stage. Thus, regeneration is effected by the oxidative removal through combustion of coke deposits from the catalyst. As conventionally effected, such regeneration causes the oxidation of the metallic catalyst to a metal oxide state. This is most undesirable as the presence of higher oxides, such as the higher oxides of iron, in the catalyst during the on-stream cracking of the low molecular weight hydrocarbon results in the production of impure hydrogen, namely hydrogen containing carbon monoxide and carbon dioxide.

Prior commercial methods for hydrogen production from natural gas have employed steam in the conversion to avoid the deposition of coke. This method is likewise unsatisfactory as it results in high carbon oxide production. To remove the carbon oxides, which are undesirable impurities in the hydrogen stream, the hydrogen stream is treated to effect conversion of the carbon oxides content to carbon dioxide, which is then adsorptively removed from the hydrogen stream by caustic or aqueous solutions under pressure. Such removal is expensive and requires considerable processing equipment.

This invention has as an object the provision of a method for generating hydrogen from low molecular weight hydrocarbons, such as methane.

This invention has as another object the provision of a method for producing hydrogen of relatively high purity.

This invention has as yet another object the provision of a continuous catalytic method for the production of hydrogen.

These and other objects are accomplished by the process of the present invention in which a natural gas comprising of a low molecular weight normally gaseous hydrocarbon, such as methane, is catalytically decomposed to elemental carbon and elemental hydrogen through contact with a catalyst comprising iron, or iron and a minor weight percentage of FeO, supported on a porous refractory solid support, such as kaolin, at an elevated temperature, such as a temperature of about 1400° F. to 2000° F. or more. A preferred embodiment of the process of the present invention comprises contacting a low molecular weight normally gaseous hydrocarbon with a catalyst comprising iron, or iron and a minor amount of the lower oxide of iron, namely FeO (such as less than 20 weight percent of the total iron content is FeO), impregnated upon a porous support, which catalyst contains not less than about one weight percent of carbon. In the preferred embodiment the contact is effected at a temperature of between 1500° F. to 1900° F. to convert the hydrocarbon into elemental hydrogen and to deposit coke upon the catalyst to a coke level of not more than about five weight percent. The deposited coke is then removed by oxidative regeneration to a coke level in which the catalyst contains not less than one weight percent of coke.

The oxidative regeneration of the catalyst should be effected in the presence of relatively high molar percentages of carbon monoxide, in any event with an amount of oxygen less than that needed to effect complete oxidative removal of the coke. It is desirable that the regeneration be effected with a regenerating gas having a carbon monoxide to carbon dioxide molar ratio of at least six to one. It has been found that by regenerating the catalyst in the presence of gases rich in carbon monoxide, or containing an insufficient amount of oxygen to effect complete removal of the coke from the catalyst, and by permitting at least one weight percent of coke to remain upon the regenerated catalyst, and preferably from 1 to 3 weight percent, the iron content of the catalyst is not noticeably oxidized to a higher oxide of iron, or at most, oxidized only in minor amount to the lower oxide of iron, such as FeO; and not into $Fe_2O_3$ or $Fe_3O_4$.

The avoidance of higher oxides of iron in the catalyst has been ascertained to be necessary because it has been found that the presence of such oxides in the catalyst tends to produce oxides of carbon during the catalytic conversion. On the other hand, the absence of higher oxides of iron from the catalyst permits the production of hydrogen having a purity in excess of 90%, and can, if desired, be made to produce hydrogen having a purity of 95% or more with less than 2% of carbon oxides in the hydrogen product and less than 10% of unconverted low molecular weight hydrocarbons.

The initial catalyst which may be used in the process of the present invention may compirse an iron oxide such as $Fe_2O_3$ or $Fe_3O_4$; or mixtures of iron oxide and manganese oxide; and in a preferred embodiment, mixtures of an iron oxide and carbon black; deposited upon a porous and refractory solid support, such as kaolin, or diatomaceous earth. The weight percent concentration of iron is not critical and the iron concentration in the catalyst may be varied over a wide range, such as from 1 to 50 weight percent, although in some cases lower or higher concentrations of iron may be used. It has been found that catalysts containing 10 weight percent of iron are particularly useful for the catalytic conversions of the present invention. A preferred embodiment of the catalyst of the present invention comprises 10 weight percent $Fe_2O_3$; 20 weight percent carbon black and 70 weight percent kaolin.

The supported iron oxide catalyst must, prior to being used in the reaction, be heated to reaction temperature such as to 1400° F. or higher, and be reduced to the elemental iron state with but a minor amount of iron in a lower iron oxide state, by contact with a reducing agent such as with a stream of hydrogen.

The reduced iron or iron and lower oxide of iron catalyst may then be used for the conversion of natural gas such as methane or a similar low molecular weight hydrocarbon to carbon and elemental hydrogen in accordance with the process of the present invention. As set forth above, this may be accomplished efficaciously at a temperature of between 1400° F. and 2000° F. or higher, preferably at a temperature of between 1500° F. to 1900° F. and a gaseous hourly space velocity of about 30 to 90 to yield hydrogen of relatively high purity. The reaction should be continued until the coke deposition upon the catalyst reaches the level of about five weight percent, at which time the catalyst should be regenerated.

The regeneration as heretofore noted may be effected with an oxidative gas rich in carbon monoxide, particularly in a gas mixture containing carbon monoxide and carbon dioxide, in which the carbon monoxide is present in a relatively high concentration such as in a ratio of at least 6:1 in respect to the carbon dioxide, or with carbon monoxide containing closely regulated amounts of air. If the molecular oxygen content is regulated at a low level the combustion products from the coke on the catalyst will consist of carbon monoxide.

The regeneration should not be effected beyond the stage at which a level of one weight percent of coke is retained upon the catalyst, since it has been found that the retention of coke to this weight percentage level serves to prevent the formation of appreciable amounts of iron oxide on the catalyst during regeneration. Thus, the residual coke on the catalyst will tend to reduce the iron oxide formed during regeneration to elemental iron.

The aforementioned reaction and regeneration stages may be effected in a continuous process in which a charge comprising a low molecular weight normally gaseous hydrocarbon is continuously converted to elemental hydrogen.

As illustrative of a preferred embodiment for producing elemental hydrogen of high purity in accordance with the process of the present invention, reference should be had to the accompanying schematic flow sheet wherein the flow of the various reactants utilized in the process of the present invention is illustrated. In the accompanying flow sheet, the hydrogen obtained in the process is utilized as a component in the preparation of synthesis gas for the manufacture of ammonia. However, the present invention is not restricted to the manufacture of hydrogen for the preparation of ammonia. Furthermore, it is, of course, to be understood that the process of the present invention is not limited to the precise arrangements shown in the accompanying flow sheet, but that the details thereof may be varied in a manner apparent to one skilled in the art.

The charge for the system comprising a natural gas, such as a natural gas containing predominantly methane or consisting entirely of methane, is introduced at ambient temperature through line 10 into preheater 12.

The pretreatment, if any, of the natural gas in line 10 is dependent upon its source. Thus, the natural gas in line 10 should be low in sulphur, carbon dioxide, water vapor and free oxygen. A desired upper limit for oxygen in all forms is 0.5 weight percent. Thus, the natural gas may be desulphurized or undergo other treatment to render it in a form suitable for use in the process of the present invention.

Within preheater 12 the natural gas is preheated to a temperature of about 1150° F. and then conveyed through line 14 to the lower lift hopper 16 of a gas lift designated generally by the numeral 18.

The preheated charge gas in lower lift hopper 16 is joined by "spent" catalyst from line 20, which spent catalyst is also at a temperature of 1150° F. By "spent" catalyst as used herein is meant catalyst which has been utilized for on-stream processing and contains the maximum coke level of up to about five weight percent coke.

In the subject example the catalyst prior to initial contact with the charge comprises about ten weight percent of iron impregnated on kaolin, and has a bulk density of one gram per cubic centimeter and a particle diameter of 0.11 inch.

The charge gas serves as the lift gas and elevates the spent catalyst from lower lift hopper 16 to upper lift hopper 22. From upper lift hopper 22 the lift gas is diverted from the catalyst, and transferred through line 24 for on-stream processing as will be described hereinbelow. The catalyst from upper lift hopper 22 is passed through line 26 to the upper portion of kiln 28.

Fuel gas, which may comprise gas similar to the charge gas in line 10 is introduced into the upper portion of kiln 28 from line 30, preheater 32 and line 34. The fuel gas is heated to a temperature of about 1150° F. in preheater 32 and is thus at about the same temperature as the catalyst which is introduced into the upper portion of kiln 28 from line 26. Air from line 36, preheater 38 and line 40 is also introduced into the upper portion of kiln 28. The air from line 36 is preferably heated within preheater 38 to a temperature of the order of 1200° F. As will be more fully discussed below, it is necessary to closely regulate the amount of air introduced into kiln 28, as both the coke level on the regenerated catalyst, and the ratio of carbon monoxide to carbon dioxide within kiln 28 is dependent upon the amount of introduced air.

The maximum degree of combustion and the highest regenerative temperature is achieved at the upper part of kiln 28 when the preheated fuel gas and air contact the catalyst having the highest coke level. Thus, with a catalyst constituting ten weight percent of iron impregnated upon kaolin, and having about 4.7 weight percent of deposited coke, a temperature of about 2150° F. will be attained in the upper portion of kiln 28 under the subject conditions. This temperature, which is 1000° F. higher than the temperature of the catalyst at its point of introduction into kiln 28 is not sufficiently high to effect appreciable catalyst breakage by thermal shock for the aforesaid type catalyst. However, if the support, or the concentration of iron, or the processing conditions are varied, the temperature increase in the upper portion of kiln 28 should be regulated so as not to exceed the maximum sudden temperature increase which the catalyst can tolerate.

The catalyst, fuel gas and air pass downwardly in concurrent flow through kiln 28, with the carbon level on the catalyst being gradually decreased during such downward passage.

At the base of kiln 28 the coke level on the catalyst is approximately one weight percent, and the temperature of the catalyst and kiln gas mixture is about 1700° F. To achieve this level of coke reduction under the aforesaid conditions, it has been found that the air introduced into kiln 28 through line 36 should be such as to yield a carbon monoxide to carbon dioxide molar ratio of about 20 to 1. Since the carbon monoxide content in the kiln gas mixture is determined by the exit kiln temperature, with the higher the temperature the higher the carbon monoxide content, an increase in the carbon monoxide content of the kiln gas mixture can be effected by raising the exit gas temperature. Alternatively, if a higher ratio of carbon monoxide is desired for specific operating conditions, carbon monoxide may be added to the regeneration gas.

The separation of regenerated catalyst from the kiln gas mixture is achieved by conventional means at the base of kiln 28, and the separated gas is removed through line 42, waste heat boiler 44 and line 46 to heat-exchanger 48. The passage of the gas through waste heat boiler 44 and heat exchanger 48 serves to reduce the temperature of the gas to a nominal value. The gas from heat-exchanger 48 may be conveyed out of the system through line 50 or may be recycled from line 50 to line 30.

The regenerated catalyst from the base of kiln 28 is conveyed through line 52 to the upper portion of reactor 54. Within reactor 54 the regenerated catalyst is countercurrently contacted with charge gas which enters reactor 54 from line 24 at the base of reactor 54.

The upward movement of the charge gas through reactor 54 results in its gradual conversion to hydrogen and elemental carbon, with the carbon depositing on the downwardly moving catalyst.

The cracking of the charge gas constitutes an endothermic reaction with the heat of reaction being furnished by the downwardly moving catalyst. Thus, during the course of the reaction there is a gradual increase in the temperature of the rising gas and a corresponding decrease in the temperature of the falling catalyst within reactor 54.

The spent catalyst having up to about five weight percent of coke deposited thereon is removed from the base of reactor 54 through line 20. As heretofore noted, such catalyst when removed is at a temperature of about 1150° F.

The product gases from the upper portion of reactor 54 are removed through line 56 and when so removed are at a temperature of about 1700° F. These product gases may comprise about 96.5 mol percent of hydrogen, about 1 mol percent of carbon monoxide, with the remainder comprising mainly unreacted methane.

In the accompanying flow sheet, as heretofore noted, the product hydrogen is converted to synthesis gas for use in the manufacture of ammonia. Thus, the product gas from the upper portion of reactor 54 is withdrawn through line 56, and nitrogen is supplied to this gas in combustor 58 wherein a controlled partial combustion with air from line 60 is effected, the oxygen in the air being converted to water.

The product gases from combustor 58 are transferred through line 62 to waste heat boiler 64 wherein such gases are cooled to a temperature of about 600° F.

From waste heat boiler 64 the product gases are transferred through line 66 to methanator 68 wherein the carbon monoxide impurity is hydrogenated to water and methane. The product gas from methanator 68 is suitable synthesis gas for ammonia manufacture and after passage through line 70 and heat-exchanger 72 wherein it is cooled to 100° F. it may be passed to an ammonia synthesis plant for conversion to ammonia. The maximum amount of carbon monoxide in the synthesis gas product is 0.01 mole percent.

The present invention may be embodied in other specific forms without departing from the spirit or essential attributes thereof and, accordingly, reference should be made to the appended claim, rather than to the foregoing specification as indicating the scope of the invention.

It is claimed:

In a process for generating hydrogen which comprises contacting a methane stream with a catalyst comprising a porous refractory support impregnated with metallic iron, said catalyst containing from 0-20% FeO by weight and being free of higher iron oxides and said catalyst further containing 1-3% by weight of residual coke, effecting said contacting at elevated temperature between 1400 and 2000° F. to form by decomposition of said methane elemental hydrogen and depositing coke upon said catalyst, continuing said contacting for a period such that the coke content of the catalyst is increased to a total content not in excess of 5% by weight of the catalyst, thereafter regenerating said catalyst by oxidative combustion with air under conditions avoiding excessive oxidation of the iron therein, the quantity of air used furnishing free oxygen in an amount insufficient to burn all the coke in the catalyst and said regeneration being under conditions such that during combustion of the coke in the catalyst a high molar ratio of at least 6:1 $CO/CO_2$ is maintained in the vicinity of the catalyst, said regeneration being continued to an extent sufficient to remove a portion of the deposited coke leaving 1-3% by weight of residual coke in said catalyst and thereafter contacting said regenerated catalyst with additional methane at said elevated temperature to form elemental hydrogen and to deposit coke upon said catalyst, the improvement which consists of the combination of: circulating catalyst particles through a confined reaction zone to a separate confined regeneration and heating zone and back to the reaction zone; controlling the temperature of said confined regeneration and heating zone within the range from about 1700° F. to about 2150° F. whereby the gas stream discharged from the regeneration zone contains a greater quantity of carbon monoxide than carbon dioxide; controlling the flow of methane through the confined reaction zone relative to the flow of catalyst particles therethrough so that at least a major portion of the methane is converted in the absence of oxidizing gases into hydrogen and carbon; and effecting the contacting of the methane and catalyst particles so that the obtained hydrogen stream is substantially free from carbon oxides.

References Cited by the Examiner

UNITED STATES PATENTS

| | | | |
|---|---|---|---|
| 2,462,861 | 3/49 | Gunness | 23—212 X |
| 2,620,313 | 12/52 | Odell | 252—417 |
| 2,647,041 | 7/53 | Robinson | 23—212 |
| 2,783,133 | 2/57 | Eastwood | 23—212 |
| 3,057,689 | 10/62 | McEvoy et al. | 23—212 |

FOREIGN PATENTS

| | | |
|---|---|---|
| 323,855 | 7/29 | Great Britain. |
| 380,893 | 9/32 | Great Britain. |

MAURICE A. BRINDISI, *Primary Examiner.*